2,856,329

METHODS OF ADMINISTERING STEROID HORMONE SOLUTIONS

Guy C. Taylor and Clyde S. Neathery, Decatur, Ill., assignors to Taylor Pharmacal Company, Decatur, Ill., a corporation of Illinois No Drawing. Application July 18, 1956
Serial No. 598,510

9 Claims. (Cl. 167—58)

This invention relates to solutions of steroid hormones and more particularly to methods of administering steroid hormones.

Briefly, the invention relates to the method of administering steroid hormones comprising injecting into the human body a substantially anhydrous solution of a steroid hormone in an organic solvent. The solvent comprises a mixture of a polyethylene glycol liquid at room temperature, and one or more additional components selected from benzyl alcohol, propylene glycol and chlorobutanol. The steroid hormone or hormones are precipitated by contact with body fluids at the site of injection.

The compositions employed by the prior art for the administration of steroid hormones by injection have been suspensions of these hormones in aqueous liquids. These suspensions have been customarily marketed in multiple dose vials containing a quantity adequate for a number of injections. A suitable proportion of the suspension is withdrawn as needed and is injected into the body in the desired location. When so administered the hormone is absorbed by the body and utilized in the body processes.

The hormone suspensions, however, have possessed a number of disadvantages. While attempts have been made to secure permanent suspensions and compositions have been obtained which are readily reconstituted upon moderate agitation, the suspensions nevertheless do not contain as effectively distributed components as preferred. Moreover, it is not possible to sterilize the hormone suspensions in the most efficient manner, hence they must be prepared by aseptic technique or subjected only to low temperature sterilization (Tyndallization). Also, hormone suspensions present hazards in the maintenance of sterility.

Among the objects of this invention may be noted the provision of a method of administering steroid hormones by injecting a substantially anhydrous solution of a steroid hormone into the human body; and the provision of solutions of steroid hormones which maintain all the advantages of the customary suspensions but possess additional pharmaceutical and technical advantages; are less painful upon injection; are completely, slowly and regularly absorbed; are more conveniently administered; precipitate the hormone in a finer particle size than is possible with suspensions; may be advantageously sterilized; and are stable. Other objects and features will be in part apparent and in part pointed out hereinafter.

The invention accordingly comprises the methods hereinafter described, the scope of the invention being indicated in the following claims.

In accordance with the present invention it has been found that injectable solutions of steroid hormones such as testosterone, progesterone, estrone, natural estrogenic substance, estradiol, desoxycorticosterone, and androstenediol, and combinations of these hormones may be prepared in certain substantially anhydrous organic solvents and injected into the human body. The solvent employed contains at least two components. One component is polyethylene glycol. Commercial products such as those sold under the trademark Carbowax are preferably employed. The polyethylene glycols which are suitable are those which are liquid at room temperature, having a molecular weight of approximately 200 or 300 or 400. The other component is also a solvent for the steroid hormone or mixture of hormones which is miscible with polyethylene glycol and is suitable for intramuscular administration. Preferably it should be a preservative or anesthetic as well. Suitable components are benzyl alcohol, propylene glycol and chlorobutanol.

The proportion of hormone may be varied depending upon the composition which is to be prepared but it should not, of course, exceed the proportion which is soluble in the solvent mixture.

Additional components may be included for particular purposes. For example, a dispersing agent such as one of the polyoxyethylene derivatives of sorbitan monolaurate (sold under the trademark Tween 20) may be included for this purpose. They are not however necessary for the practice of this invention. The compositions of the present invention may include several of the steroid hormones referred to above. Where this is the case, the solubility of the combination of hormones is the limiting factor on the proportion which may be included in the solutions of the present invention.

The solutions of the instant invention may be sterilized in the most efficacious manner. For example, they may be autoclaved at 15 pounds gauge pressure for 20 minutes. The suspensions of the steroid hormones previously employed cannot be so sterilized but they must be prepared by aseptic technique or subjected only to low temperature sterilization. Because of this it is difficult to achieve and to maintain sterility for the steroid suspensions.

Upon injection into the body it has been found that the steroid solutions of the present invention react with the water content of the body fluids to precipitate the hormone from the solution. The hormone is then utilized by the body in the same way as the hormone content of the steroid suspensions is utilized. However, the steroid is precipitated from the solutions in a more finely divided form than is provided by the previously known suspensions and is, therefore, more effectively absorbed by the organism.

The administration of steroid hormones through the method of the present invention is less painful than with injection of the steroid suspensions of the prior art and the solutions employed are completely, slowly and regularly absorbed. Since they do not require shaking to reconstitute after standing, they are more conveniently administered and they are entirely uniform. This last is of especial importance when the customary multiple dose vial is employed.

It is only necessary to avoid the use of instruments which are not dry. A dry sterile syringe is the only instrument required to administer them.

The hormone solutions of the present invention are stable. No crystallization occurs at a temperature of 0° C. for 24 hours. When they congeal at extremely low temperatures the products may be completely reconstituted merely by warming to 70° C. The solutions are practically neutral and are within the pH range of 6.9 to 7.2. They do not cake or form concretions in the vial and they require no shaking or other preliminary preparation for administration.

The following examples illustrate the invention:

*Example 1*

A steroid hormone solution was prepared by dissolving testosterone U. S. P. in a vehicle consisting of 15% by weight propylene glycol N. F., 5% by weight of benzyl alcohol N. F., and 80% by weight of polyethylene glycol having a molecular weight of approximately 300 (Carbowax 300) N. F. A solution was first prepared by mixing the required amounts of propylene glycol and benzyl alcohol. The testosterone was then added and completely dissolved in this mixture in the proportion of 50 mg. per cc. The resulting solution was brought to the required volume by the addition of polyethylene glycol thus forming a clear and permanent solution. It is essential that the testosterone be dissolved in the more efficient solvent prior to dilution with polyethylene glycol. The resulting product was subsequently filtered and filled into previously washed, dried and sterilized multiple-dose vials. The filled vials were stoppered, sealed and finally sterilized at 15 pounds gauge pressure for 20 minutes.

The resulting solution was stable, did not crystallize after 24 hours at 0° C., did not cake or form concretions in the vial and required no shaking or other preliminary preparation prior to administration. It was entirely safe for administration to human beings in the same doses of active component as the steroid suspensions previously known. However, it was less painful to the patient upon injection. After administration it reacts with the water content of the body fluids to precipitate the steroid hormone which is then completely, slowly and regularly absorbed. The therapeutic effect of the steroid hormone is equivalent to the therapeutic effect of a suspension of the same hormone heretofore employed.

*Example 2*

Example 1 was repeated except that a vehicle containing 10% by weight of benzyl alcohol N. F. and 90% by weight of polyethylene glycol 300 N. F., was employed. The results obtained with the solution were in every way comparable to the results with the Example 1 solution.

*Example 3*

Example 1 was repeated but the testosterone was added in the ratio of 25 mg. per cc. and the solvent employed was a mixture of 0.5% by weight chlorobutanol U. S. P. and 99.5% by weight polyethylene glycol 300 N. F. The results obtained with the solution were comparable to those set forth in Example 1.

*Example 4*

Example 3 was repeated but the solvent employed consisted of 50% by weight propylene glycol N. F. and 50% by weight polyethylene glycol 300 N. F. Comparable results were secured.

*Example 5*

Example 1 was repeated except that progesterone U. S. P. was utilized in lieu of testosterone and the vehicle consisted of 45% by weight propylene glycol N. F., 15% by weight benzyl alcohol N. F., 35% by weight polyethylene glycol 300 N. F. and 5% by weight glacial acetic acid U. S. P. The glacial acetic acid esterified the progesterone to convert it to a particularly desirable pharmaceutical form. In other respects the results secured with the solution were comparable to those in Example 1.

*Example 6*

Example 2 was repeated but in lieu of the testosterone, progesterone U. S. P. was employed. The results obtained with the solution were comparable to those secured with the Example 2 solution.

*Example 7*

Example 1 was repeated but estrogenic substance (natural) in the proportion of 2 mg per cc. was added to the solvent in lieu of the testosterone, and the solvent consisted of 5% by weight of benzyl alcohol N. F. and 95% by weight of polyethylene glycol 300 N. F. The results obtained with the solution were comparable to those secured with the Example 1 solution.

*Example 8*

Example 7 was repeated except that the steroid hormone employed was 5 mg. per cc. of estrone U. S. P. in lieu of the estrogenic substance. Comparable results were secured with the solution.

*Example 9*

Example 6 was repeated but in lieu of the progesterone, 1.2 mg. per cc. of estradiol N. F., 25 mg. per cc. of testosterone U. S. P. and 25 mg. per cc. of progesterone U. S. P. were added to the solvent. Comparable results were secured with the solution.

*Example 10*

Example 8 was repeated but in lieu of the estrone, 25 mg. per cc. of testosterone U. S. P. and 2 mg. per cc. of estrone U. S. P. were added to the solvent. Comparable results were secured with the solution.

If desired a small proportion of a polyethylene derivative of sorbitan monolaurate (Tween 20) may be added as a dispersing agent. In such instances the dispersing agent should preferably not exceed 0.1% by weight of the solvent.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

We claim:

1. The method of administering steroid hormones comprising injecting into the human body a substantially anhydrous solution of a steroid hormone in an organic solvent which solvent comprises polyethylene glycol liquid at room temperature and at least one substance selected from the group consisting of benzyl alcohol, propylene glycol and chlorobutanol.

2. The method of administering steroid hormones comprising injecting into the human body a substantially anhydrous solution of a steroid hormone in an organic solvent which solvent comprises polyethylene glycol 300 and at least one substance selected from the group consisting of benzyl alcohol, propylene glycol and chlorobutanol.

3. The method of administering steroid hormones comprising injecting into the human body a substantially anhydrous solution of testosterone in a solvent which comprises polyethylene glycol 300 and at least one substance selected from the group consisting of benzyl alcohol, propylene glycol and chlorobutanol.

4. The method of administering steroid hormones comprising injecting into the human body a substantially anhydrous solution of progesterone in a solvent which comprises polyethylene glycol 300 and at least one substance selected from the group consisting of benzyl alcohol, propylene glycol and chlorobutanol.

5. The method of administering steroid hormones comprising injecting into the human body a substantially anhydrous solution of estrone in a solvent which comprises polyethylene glycol 300 and at least one substance selected from the group consisting of benzyl alcohol, propylene glycol and chlorobutanol.

6. The method of administering steroid hormones comprising injecting into the human body a substantially anhydrous solution of natural estrogenic substance in a solvent which comprises polyethylene glycol 300 and at least one substance selected from the group consisting of benzyl alcohol, propylene glycol and chlorobutanol.

7. The method of administering steroid hormones comprising injecting into the human body a substantially anhydrous solution of estradiol in a solvent which comprises polyethylene glycol 300 and at least one substance selected from the group consisting of benzyl alcohol, propylene glycol and chlorobutanol.

8. The method of administering steroid hormones comprising injecting into the human body a substantially anhydrous solution of desoxycorticosterone in a solvent which comprises polyethylene glycol 300 and at least one substance selected from the group consisting of benzyl alcohol, propylene glycol and chlorobutanol.

9. The method of administering steroid hormones comprising injecting into the human body a substantially anhydrous solution of androstenediol in a solvent which comprises polyethylene glycol 300 and at least one substance selected from the group consisting of benzyl alcohol, propylene glycol and chlorobutanol.

References Cited in the file of this patent

UNITED STATES PATENTS 2,600,344   Van Meter _____ June 10, 1952

FOREIGN PATENTS 510,947   Belgium _____ May 15, 1952

OTHER REFERENCES

Greenspan: J. A. Ph. A. (Sci. Ed.) January 1951, p. 54.
Friedman: J. Lab. and Clin. Med., May 1944, pp. 530 and 531.